United States Patent
Flanagan et al.

(10) Patent No.: US 6,343,371 B1
(45) Date of Patent: Jan. 29, 2002

(54) SYSTEM AND METHOD FOR STATICALLY DETECTING POTENTIAL RACE CONDITIONS IN MULTI-THREADED COMPUTER PROGRAMS

(75) Inventors: Cormac A. Flanagan, Palo Alto, CA (US); Andrew B. Bernard, Pittsburgh, PA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/231,856

(22) Filed: Jan. 14, 1999

(51) Int. Cl.⁷ .................................................. G06F 9/45
(52) U.S. Cl. ................................ 717/1; 700/17; 703/22
(58) Field of Search ..................... 717/1, 11, 6; 703/22, 703/23; 709/500; 700/300, 17, 18

(56) References Cited

U.S. PATENT DOCUMENTS

| | | | | |
|---|---|---|---|---|
| 5,202,208 A | * | 4/1993 | Holiday, Jr. .................... | 717/11 |
| 5,430,850 A | * | 7/1995 | Papadopoulos et al. ...... | 709/314 |
| 5,497,500 A | * | 3/1996 | Rogers et al. ................... | 717/1 |
| 5,560,012 A | * | 9/1996 | Ryu et al. ........................ | 717/1 |
| 5,768,594 A | * | 6/1998 | Blelloch et al. ................ | 717/6 |
| 5,937,194 A | * | 6/1998 | Sundaresan ..................... | 717/5 |
| 5,860,009 A | * | 1/1999 | Uchihira et al. ................ | 717/6 |
| 5,920,718 A | * | 7/1999 | Uczekaj et al. ................. | 717/2 |
| 5,956,479 A | * | 9/1999 | McInerney et al. ............ | 714/38 |
| 5,999,729 A | * | 12/1999 | Tabloski, Jr. et al. ........... | 717/1 |
| 5,999,734 A | * | 12/1999 | Willis et al. ..................... | 717/6 |
| 5,999,987 A | * | 12/1999 | O'Farrell et al. ............. | 709/330 |
| 6,014,666 A | * | 1/2000 | Helland et al. ................. | 707/9 |
| 6,042,614 A | * | 3/2000 | Davidson et al. ............... | 717/4 |
| 6,098,090 A | * | 8/2000 | Burns .......................... | 709/107 |
| 6,108,754 A | * | 8/2000 | Lindholm ..................... | 711/122 |
| 6,125,382 A | * | 9/2000 | Brobst et al. ................. | 709/102 |

OTHER PUBLICATIONS

Cheng, G.–I. et al., "Detecting Data Races In Cilk Programs that Use Locks", in ACM Symposium on Parallel Algorithms and Architectures., (1998), pp. 1–12.

Fajstrup, L. et at., "Detecting Deadlocks in Concurrent Systems", To be presented at CONCUR'98., (1997), pp. 1–20.

Savage, S. et al., "Eraser: A Dynamic Data Race Detector for Multi–Threaded Programs", ACM Transactions on Computer Systems 15, 4, 391–411., (1997), pp.27–37.

Callahan, D. and Subhlok, J., "An Empirical Comparison of Static Concurrency Analysis Techniques", Technical Report 96–084, Department of Computer Science, University of Massachusetts at Amherst, (1996), pp. 1–29.

Corbett, J. C., "Evaluating Deadlock Detection Methods for Concurrent Software", IEEE Transactions on Software Engineering 22, 3., (3/96), pp. 1–22.

(List continued on next page.)

Primary Examiner—Mark R. Powell
Assistant Examiner—Anil Khatri
(74) Attorney, Agent, or Firm—Pennie & Edmonds LLP

(57) ABSTRACT

A race condition detection system and method statically detects potential race conditions in a multi-threaded computer program. The race condition detector builds a synchronization graph representing at least a subset of a computer program's method declarations, field declarations, and synchronization statements. Edges are constructed between the nodes representing execution paths in the computer program. Each node is associated with a set of lock designations that correspond to all locks that are consistently held along all executions paths in the computer program to the respective node. The race condition detector analyzes this information to determine whether accesses to object data fields are consistently protected by an appropriate lock. An object data field access that is not protected by an appropriate lock indicates a potential race condition. At least a subset of indicated potential race conditions are reported.

18 Claims, 4 Drawing Sheets

OTHER PUBLICATIONS

Sterling, N., "Warlock: A static Data Race Analysis Tool", In USENIX Winter Technical Conference 1–106., (1993), pp. 1–12.

Emrath, P. A. and Padua, D. A., "Automatic Detecting of Nondeterminacy in Parallel Programs", In Workshop on Parallel and Distributed Debugging. (1988), pp. 89–99.

Young, M. and Taylor, R. N., "Combinging Static Concurrency Analysis wth Symbolic Execution", IEEE Transactions on software Engineering 14, 10 (5/88), pp. 1499–1511.

Appelbe, W. F. and McDowell, C.E., "Integrating Tools for Debugging and Developing Multitasking Programs", In Workshop on Parallel and Distributed Debugging., (1988), pp. 78–88.

Callahan, D., and Subhlok, J., "Static Analysis of Low–level Synchronization", In Workshop on Parallel and Distributed Debugging., (1988), pp. 100–111.

Abdullahi et al, "Garbage colling the internet: a survey of distributed garbage collection", ACM Compt. Survey, vo. 30, No. 3, pp 330–373, Aug. 1998.*

Brosgol, "A comparision of the concurrency features of Ada 95 and Java", ACM SIGAda, pp 175–192, Mar. 1998.*

Naumovich et al, "Data flow analysis for checking propertise of concurrent Java programs", ACM ICSE pp 399–410, 1999.*

Netzer et al, "Improving the accuracy of data race detection", ACM pp 133–144, Jun. 1991.*

Flanagan et al, "pHIuid: the design of a parellel functional language implemention on workstations", ACM ICFP, pp 169–179, May 1996.*

Choi et al, "Deterministic replay of Java multithreaded applications", ACM SPDT, pp 48–59, May 1998.*

Choi et al, "Race fronter: reproducing data race in Parallel program debugging", ACM pp 145–154, Jun. 1991.*

Park et al, "Detecting the first races in parallel programs with ordered synchronization", IEEE, pp 201–208, 1998.*

Savage et al, "Eraser: a dynamic data race detector for multithreaded programs" ACM Trans. Compt. Survey, v 16, No. 4, pp 391–411, Nov. 1997.*

Corbett, "Constructing compact models of concurrent java programs", ACM ISSTA pp 1–10, Aug. 1998.*

Diniz et al, "Synchronization transformation for parallel computing", ACM POPL, pp 187–200, Mar. 1996.*

Flanagan et al, "Compoential set based analysis" ACM PLDI, pp 235–248, Jun. 1997.*

Rinard et al, "Eliminating synchronization bottleneck in object based programs using adaptive replication" ACM ICS, pp 83–92, 1999.*

* cited by examiner

SYSTEM AND METHOD FOR STATICALLY DETECTING POTENTIAL RACE CONDITIONS IN MULTI-THREADED COMPUTER PROGRAMS

The present invention relates generally to a system and method for statically detecting potential race conditions in multi-threaded computer programs, and more particularly to building and analyzing a synchronization graph—the synchronization graph representing certain computer program elements and execution paths—to detect potential race conditions on object data fields.

BACKGROUND

Most commercial operating systems, such as Microsoft Windows 95 and modern programming languages, such as C++ and Java, support the use of threads. Many popular software applications, such as Microsoft Word and Netscape Navigator, are multi-threaded. In a multi-threaded environment, a program may consist of one or more threads of control, each of which shares a common address space and most other program resources. Multi-threading is often used to exploit internal software application and hardware parallelism, resulting in among other things, improved networking performance, and the speeding up of user feedback response.

Programming with multiple threads introduces the potential for a timing dependent error known as a race condition. In order for a race condition to occur, the following three conditions must be present: (a) two or more threads executing in parallel (hereinafter referred to as "parallel threads") access a same memory location at nearly the same time; (b) at least one of the threads modifies the data in that memory location; and (c) the threads use no explicit mechanism, or lock, to prevent the accesses from being simultaneous. This type of unsynchronized access to a memory location can produce unintended results. To illustrate the idea of a race condition, consider the program illustrated in Table 1, where two unsynchronized threads access and change the value of a shared resource. The program illustrated in Table 1 is written in the Java programming language, but the problem illustrated is applicable to all multithreaded programming environments.

TABLE 1

An Example of Unsynchronized Access to Shared Resource

```
public class T extends Thread {
    static D d = new D ();          //create a shared object
    public static void main (String []args) {  // main thread starts here
        (new T ()).start ();        //starting new thread
            d.f++;                  //access a shared field
    }
    public void run () {            //the new thread starts here
        d.f--;                      //access to a shared field
    }
}
class D {
    int f = 0;
}
```

This program has a potential race condition because access to the shared data field "d.f" in both methods, "main( )" and "run( )," is not protected by any lock. At runtime, the increment operation (d.f++) and the decrement operation (d.f--) may therefore be interleaved in an arbitrary manner, producing unpredictable results. If these two operations do not overlap, then the resulting value of d.f will correctly be zero. If the operations do overlap, then the result could also be either of −1 or +1, which presumably is not what the programmer intended.

A few simple techniques are commonly used in modern programming languages to synchronize the activities of threads. Most of these techniques are based on the concept of monitors, or locks. It is not necessary to know the details of how these various techniques work to practice the present invention. However, a brief explanation of how locks work is provided as background information.

A lock is typically associated with a resource that multiple threads may need to access, but that should be accessed by only one thread at a time. If the resource is not being used, a thread can acquire its lock and access the resource. However, if another thread already has the lock to the resource, all other threads have to wait until the current thread finishes and releases the lock. Then another thread can acquire the lock and access the resource.

The unsynchronized access to a shared resource illustrated by the program in Table 1 can be fixed by coordinating the activities of the threads, so that they do not collide in the same address space. The program in Table 2 illustrates parallel executing threads synchronizing access to a shared resource.

TABLE 2

An Example of Synchronized Access to Shared Resource

```
100  public class T extends Thread {
101      static D d = new D ();      //create a shared object
102
103      public static void main (string []args) {  // main thread starts here
104          (new T ()).start ();    //starting new thread
105          synchronized(d) {
106              d.f++;              //access a shared field
107          }
108      }
109      public void run () {        //the new thread starts here
110          synchronized
                 (d) {               //perform synchronization
111              d.f--;              //access to a shared field
112          }
113      }
114  }
115
116  class D {
117      int f = 0;
118  }
```

This program uses a locking mechanism (identified by the "synchronize" statement) to synchronize the two parallel executing threads. Thus, the increment operation (d.f++) and the decrement operation (d.f--) cannot overlap and the value of d.f will correctly be zero.

Even with the availability of locks, or monitors, it is easy to introduce race conditions into a computer program. A computer programmer, for example, may inadvertently overlook the need for a synchronization instruction, accidentally leave a synchronization instruction out, or implement the instructions in the wrong order.

In addition to race conditions being easy to introduce into a computer program, they are also generally very difficult to find. For one, a data race typically becomes apparent only if two threads access an improperly protected memory location at nearly the same time. A program could potentially run for a long time without showing any signs of a problem. Also, since threads may be time-sliced, which means they can run in arbitrary bursts as directed by the operating system, the symptoms may be different each time a race condition actually occurs.

Race detection schemes have been studied for decades. What has resulted are a number of commonly used techniques used for detecting potential race conditions. These techniques can be categorized as either dynamic or static. In general each technique has problems. For instance, since dynamic detection schemes operate while the program is executing, they can significantly slow down an application due to the overhead incurred by making a procedure call at every load and store instruction. (See Savage et al., "Eraser: A dynamic Data Race Detector for Multi-threaded Programs," 1997, page 32, first para.). Also, since dynamic detection schemes utilize testing methodologies, they may fail to detect certain race conditions because of insufficient test coverage.

An example of a static race detection scheme is disclosed by WARLOCK (See Sterling, "WARLOCK A Static Data Race Analysis Tool," SunSoft, Inc., 1993). WARLOCK works "by tracing the execution of every path through the code." (See page 3, col. 2, para. 2). WARLOCK traces each execution path by analyzing a file output as the result of compiling the computer program. One problem with path tracing race detection algorithms is that static race detection systems such as that of WARLOCK do not support the use of dynamically dispatched method calls and will therefore not detect potential race conditions in source code written with an object-oriented language, such as C++ or Java. Secondly, in a worst-case scenario, the execution time of the algorithm increases exponentially with the size of the program being analyzed. As if these problems were not enough, systems such as WARLOCK do not infer information about which fields may be shared between multiple threads (a race condition can only occur on object data fields shared by multiple threads). The absence of this information can result in spurious, or false alarms indicating potential race conditions on unshared, or thread-local, object data fields. Often, in order to avoid such false alarms, a programmer must annotate the source code of the computer program with declarations about which data fields are not shared.

Other race detection schemes are described in Young and Taylor ("Combining Static Concurrence Analysis with Symbolic Execution," IEEE Transactions on Software Engineering, Vol. 14, No. 10, October 1989), Appelbe and McDowell ("Integrated Tools for Debugging and Developing Multitasking Programs," Ga. Institute of Tech. and Univ. of Santa Cruz, 1988), Callahan and Subhlok ("Static Analysis of Low-level Synchronization," Rice University, 1988), Emrath and Padua ("Automatic Detection of Nondeterminacy in Parallel Programs," Univ. of Il., 1988), and Cheng et. al. ("Detecting Data Races in Cilk Programs that Use Locks," Proceedings of the Tenth Annual ACM Symposium on Parallel Algorithms and Architectures, 1998).

Model checking of concurrent programs for potential race condition detection is well known. See, for example, Chamillard et al ("An Empirical Comparison of Static Concurrence Analysis Techniques," 1996), Corbett ("Evaluating Deadlock Detection Methods for Concurrent Software," IEEE Transactions on Software Engineering, Vol. 22, No. 3, 1996), and Fajstrup et. al. ("Detecting Deadlocks in Concurrent Systems," Aalborg University, 1997). Although this approach has proven useful on finite state systems, it cannot be directly applied to non-finite state systems, including those that dynamically allocate data and objects through the use of programming languages such as C++ or Java.

In light of the above, it would be beneficial to have a system and methodology for detecting potential race conditions that: (a) works with programming languages that dynamically allocate objects and data; (b) reduces false alarms by inferring information about which data fields may be shared between multiple threads; (c) detects potential race conditions independent of test coverage; and (d) does not slow down program execution during a debugging process.

SUMMARY OF THE INVENTION

In summary, the present invention is a system and method for statically detecting potential race conditions in multi-threaded computer programs. The computer program is typically in an object oriented programming language having at least one class, and each class normally has at least one method or at least one data field.

The method begins by generating a synchronization graph representing method declarations, object field declarations and synchronization statements in a specific program. Each method declaration, object field declaration and synchronization statement in the specific program that is represented by the synchronization graph is represented by a respective node in the synchronization graph. Each node contains synchronization information indicating the locks acquired when the body of code corresponding to that node is entered. Edges between the nodes represent execution paths of the program and program accesses to the object data fields in the computer program.

Next, the synchronization graph is traversed and a synchronization value is generated for each node in the graph. Each node's synchronization value represents a union of first and second values, the first value corresponding to the synchronization information stored for the node, and the second value corresponding to an intersection of all locks applicable to each other node in the graph for which there is an edge pointing to the node from the other node.

The method reports at least a subset of the nodes representing object field declarations whose synchronization value is a predefined null value.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
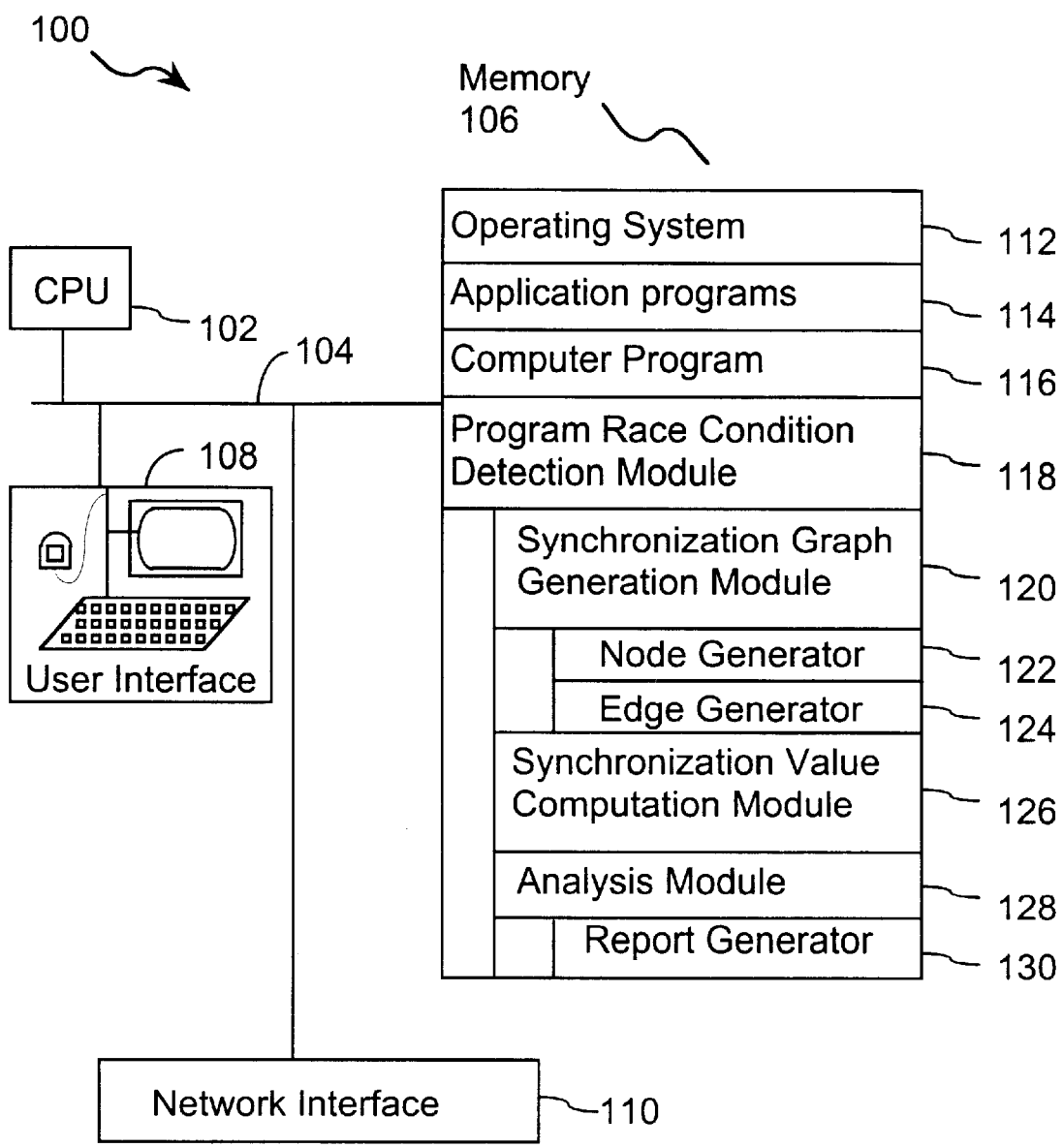
FIG. 1 is a block diagram of a programmed general purpose computer according to an embodiment of the Program Race Condition Detection system.

Referring to FIG. 1, the present invention may be implemented using a programmed general-purpose computer system 100. The computer system 100 includes: (a) one or more data processing units (CPU's) 102; (b) memory 106, which will typically include both high speed random access memory as well as non-volatile memory (such as one or more magnetic disk drives); (c) a user interface 108; (d) a network or other communication interface 110 for communicating with other computers as well as other devices; and (e) one or more communication busses 104 for interconnecting the CPU(s) 102, memory 106, user interface 108, and network interface 110.

The computer system's memory 106 stores procedures and data, typically including: (a) an operating system 112 for providing basic system services; (b) application programs 114, such as user level programs for viewing and manipulating images; (c) a computer program 116, representing a multi-threaded computer program with potential program race conditions; and (d) a Program Race Condition Detection Module 118, for analyzing the computer program 116 for potential program race conditions and reporting at least a subset of identified potential race conditions.

The Program Race Condition Detection Module 118 may contain: (a) a Synchronization Graph Generation Module 120, for generating a synchronization graph representing all method declarations, object field declarations and synchronization statements in the computer program 116; (b) a synchronization value computation module 126, for traversing the synchronization graph and computing synchronization values for each method declaration, object field declaration and synchronization statement represented in the synchronization graph; and (c) an analysis module 128, for determining if any of the synchronization values generated by the synchronization value computation module 126 indicate a potential race condition.

The synchronization graph generation module 120 may include: (a) a node generator 122, for generating a respective node for each method declaration, object field declaration and synchronization statement in the computer program 116; and (b) an edge generator 124, for generating edges between the nodes of the graph representing execution paths of the computer program 116 and program accesses to the object data fields in the computer program 116.

The analysis module 128 may include a report generator 130, for reporting at least a subset of the object data field declarations with synchronization values indicating potential race conditions.

Example of a Synchronization Graph

Figure 2:
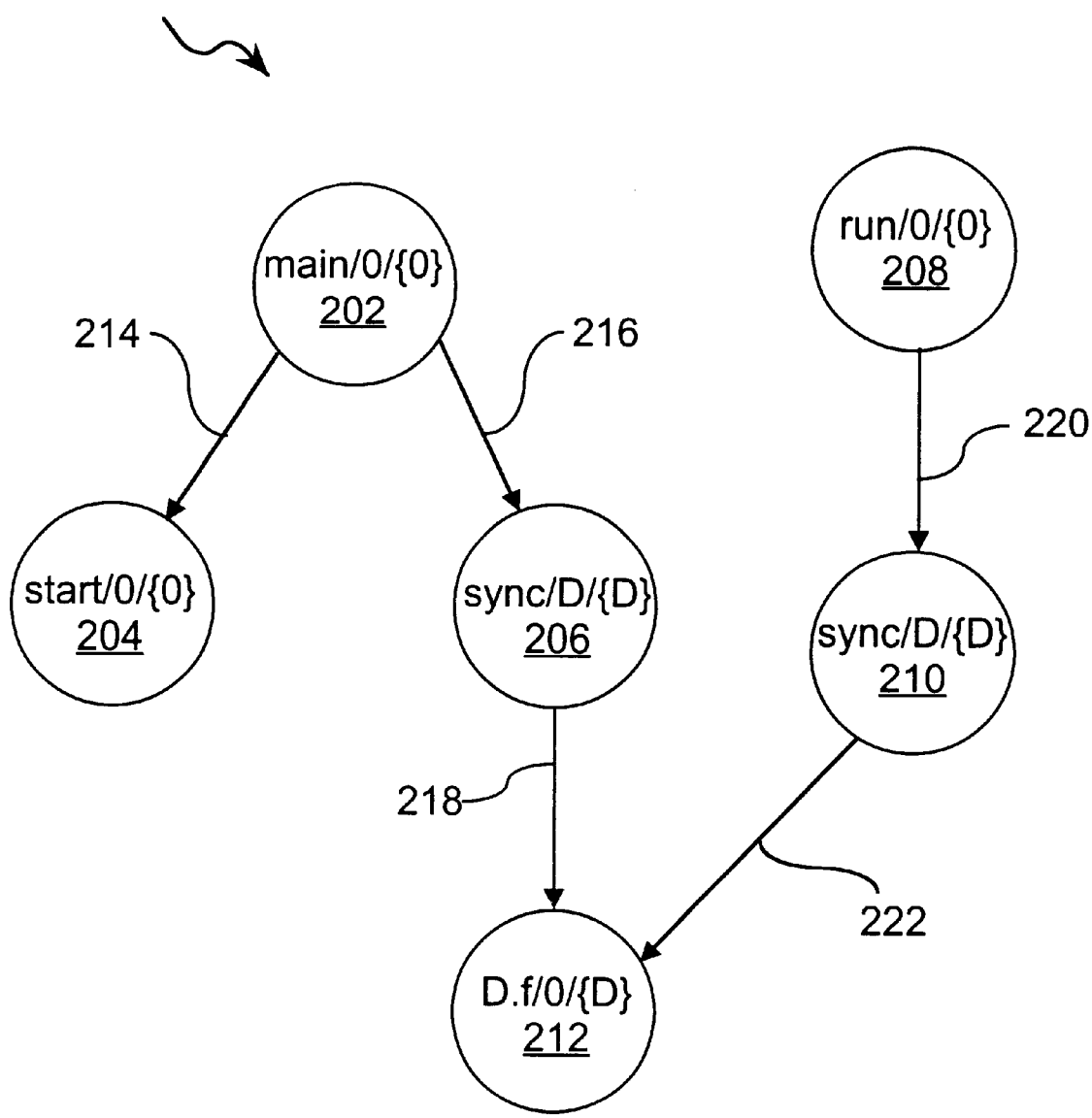
FIG. 2 is a block diagram of an example of a synchronization graph for illustrating components of a synchronization graph.

Referring to FIG. 2, there is shown an example of a synchronization graph 200 generated by a Program Race Condition Detection Module of the present invention. The synchronization graph 200 comprises nodes 202–212 and edges 214–222. Each node 202–212 is written as "name/synchronization information/{synchronization value}". The "synchronization value" for a node specifies a set of lock designations, and thus the synchronization value may be represented by a list of locks.

Each node 202–212 represents a method declaration, field declaration, or synchronization statement in the sample computer program shown in Table 2. For instance, node 202 is associated with method main( ). (See Table 2, line 103). Node 204 is associated with method start( ). (See Table 2, line 104). Node 206 is associated with a synchronization statement in method main( ). (See Table 2, line 105). Node 212 is associated with an object data field declaration ("f") in class D. (See Table 2, line 117). Node 208 is associated with method run( ). (See Table 2, line 109). And, node 210 is associated with a synchronization statement in method run( ). (See Table 2, line 110).

Referring to Table 2, method declarations corresponding to the "start" method and the "run" method are not shown. The particular program expressions shown in Table 2—in reference to these methods—are method calls (or control transfers). Node 204 and node 208 represent respective method declarations for the "start" method and the "run" method. How can a node be created in the synchronization graph 200 for a method declaration (e.g., for the start method) that is not present in the computer program shown in Table 2? To answer this question, it is necessary to understand that a class derived from a base class inherits methods and data fields declared in the base class. The "start" method declaration is declared in a base class named "Thread", which is referenced in line 100 of Table 2. More specifically, line 100 of Table declares that class "T" inherits methods and data fields declared in the class named "Thread." Therefore, the synchronization graph 200 properly represents the "start" method declaration with node 204.

Each node 202–212 is connected to another node 202–212 by an edge 214–222. Each edge 214–222 corresponds to a control transfer (or method call) to an object method in a computer program, a object data field access (i.e., a read or write operation), or a program expression (or instruction) protecting another set of program expressions with a designated lock. For example, edge 214 represents a control transfer from object method main( ), to object method start( ). (See Table 2, line 104). Edge 216 represents an instruction protecting a set of instructions with a designated lock in method main( ). (See Table 2, line 105). In this example, the instruction is a Java "synchronize" instruction. Edge 218 represents a field access to data object data field "d.f" within a block of instructions protected by a designated lock—the Java "synchronize" instruction. (See Table 2, lines 105–106). Edge 220 represents a synchronize statement in run( ). (See Table 2, line 110). And, edge 222 represents a field access to field d.f within a synchronize block (See Table 2, lines 110–111).

Node Data Structure

Figure 3:
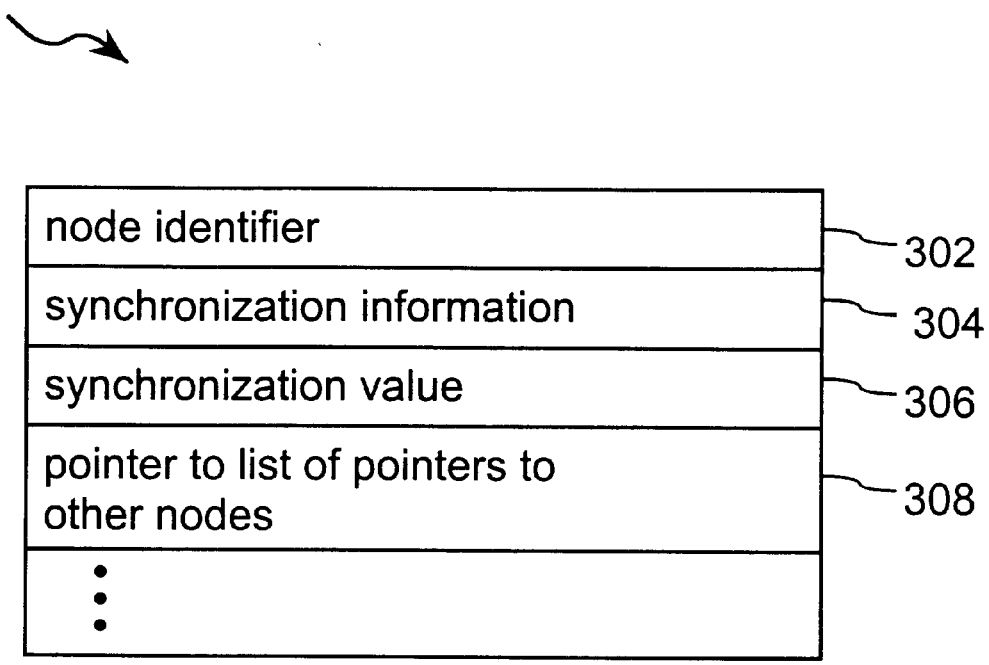
FIG. 3 is a block diagram of a node data structure for illustrating an example of a data structure associated with each node in a synchronization graph.

Referring to FIG. 3, there is shown an example of a node data structure 300. A node data structure includes the following data elements: a node identifier 302, synchronization information 304, a synchronization value 306, and a pointer to a list of pointers to other nodes 308. Each node in a synchronization graph has an associated node data structure 300.

As noted above, with reference to FIG. 2, each node 202–212 is written as "name/synchronization information/{synchronization value}". A node's synchronization information 304 indicates a lock designation associated with a particular method declaration, field declaration, or synchronization statement that the node represents. A node's synchronization information 304 is empty, or "0," if the particular method declaration, field declaration, or synchronization statement represented, is not protected by an associated lock designation. As previously indicated, the synchronization value for a node specifies a set of lock designations, and thus the synchronization value may be represented by a list of locks.

In a preferred embodiment, an object-class-type approximation is used to designate a lock. For example, a method may be associated with a lock when it is declared in a computer program. According to the present invention, a lock designation for the method declaration is a class type encompassing the method declaration. To further illustrate this approximation, suppose that "class A" includes a method called start( ). The statement "synchronized public void start( )," written using Java programming language syntax, associates lock designation "A" with method start( ).

A node in a synchronization graph representing a method declaration for method start( ) would have associated synchronization information 304 equal to lock designation "A."

Each node 202–212 in the synchronization graph 200 has a synchronization value 306 specifying an associated set of lock designations. A node's synchronization value 306 indicates all lock designations that are consistently held along all execution paths in the computer program to the particular method call, object data field access, or synchronization statement. In particular, a node's synchronization value 306 indicates a union of first and second values, the first value corresponding to the node's synchronization information 304, and the second value corresponding to an intersection of all lock designations applicable to each other node in the synchronization graph for which there is a directed edge pointing to the node from the other node.

For example, referring also to FIG. 2, if a node representing a field declaration has an associated synchronization value 306 that includes a class type of "D," (as illustrated by node 212) then a lock on an object of class type "D" must have been acquired every time that the data field associated with the object data field declaration is accessed in the computer program.

Program Race Condition Detection Module

Figure 4:
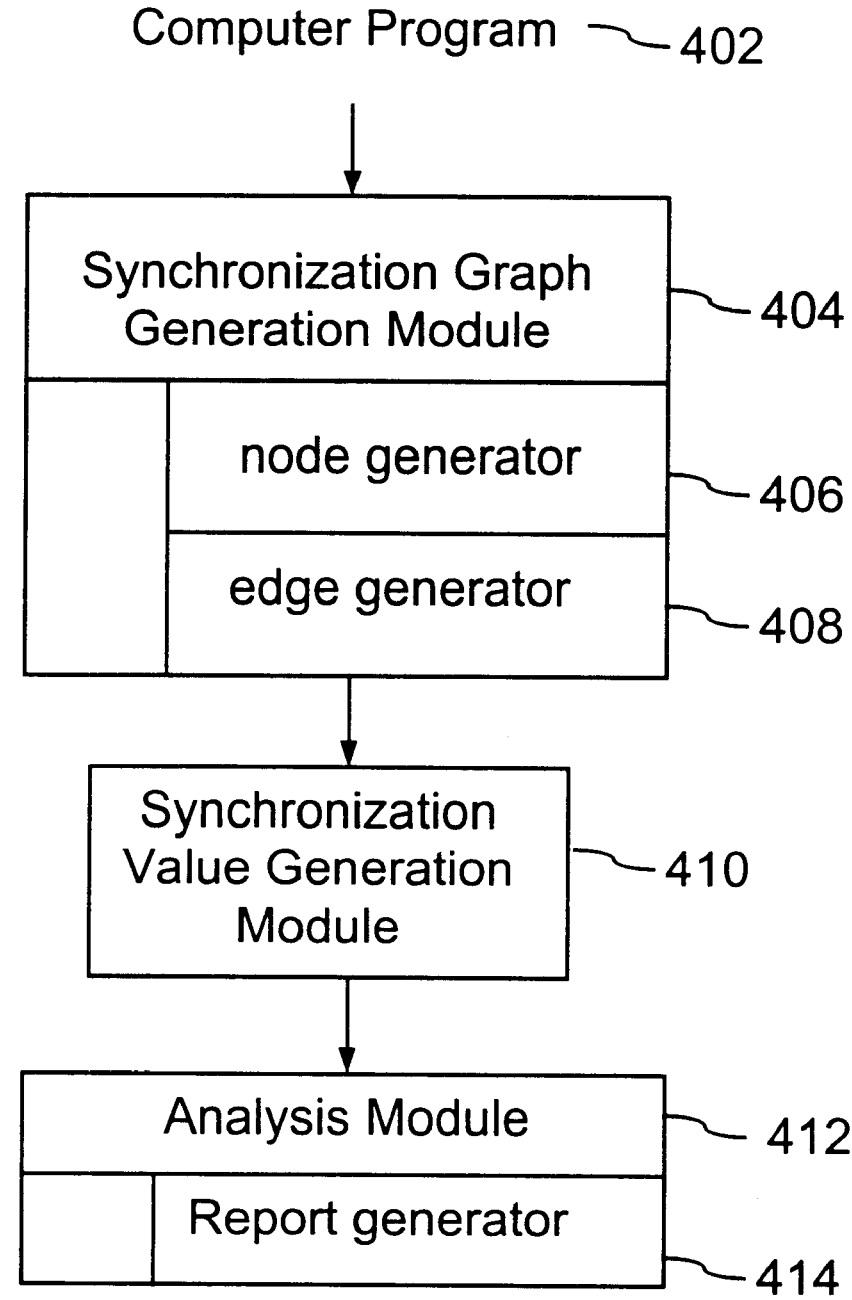
FIG. 4 is a block diagram of an example of an architecture of a Program Race Condition Detection Module of the present invention.

Referring to FIG. 4, there is shown a block diagram of an example architecture of a Program Race Condition Detection Module 400. The Program Race Condition Detection Module analyzes a multi-threaded computer program 402 for potential race conditions on object data fields, and reports a least a subset of the potential race conditions identified. The computer program 402 is typically written in an object-oriented programming language. In a preferred embodiment the computer program 402 is written in the Java programming language.

The Synchronization Graph Generation Module 404 begins by building a synchronization graph. The Synchronization Graph Generation Module 404 may include a node generator 406, for generating nodes representing at least a subset of the method declarations, object data field declarations and synchronization statements in the computer program 402. The Synchronization Graph Generation Module 404 may also include an edge generator 408, for generating edges between the nodes representing execution paths of the computer program 402, and in particular, control transfers to object methods, synchronization statements, and program accesses to the object data fields in the computer program 402.

In a preferred embodiment, the edges between nodes are directed edges. Each edge has a first node at its origin and a second node to which it points, each edge indicating that all locks applicable to the first node are also applicable to the second node for a corresponding execution path of the program.

The Synchronization Value Generation Module 410 traverses the edges between the nodes in a synchronization graph in order to generate a corresponding synchronization value (a set of lock designations) for each node. The step of traversing begins at a root node in the synchronization graph. In a preferred embodiment, a root node is defined as a node representing a method declaration that is a "starting point" for a thread in a computer program.

The Analysis Module 412 identifies those nodes representing object data declarations with synchronization values indicating potential race conditions. The Analysis Module 412 may include a report generator 414, for reporting at least a subset of the potential race conditions identified. To illustrate the step of reporting, consider the synchronization graph illustrated in Table 3, where each node is written as "name/synchronization information/{synchronization value}."

TABLE 3

Example of Synchronization Graph for the Program Illustrated in Table 1

```
main()/empty/{0}----------------------------------------->start ()/empty/{0}
              \
                \----------------------------->|
                                                |D.f/empty/{0}
                                    /---------|
run()/empty/{0}---------------------------->sync.stmt/D/{D}
```

This program shows a potential race condition on object data field "D.f.". Although method run( ) accesses "D.f" on an execution path that acquires an appropriate lock, "D.f" is also accessed from method main( ) on an execution path that does not acquire an appropriate lock, or any locks for that matter. Since a lock is not consistently held along all execution paths accessing "D.f," the synchronization value associated with the node representing the object data field declaration for "D.f" is empty. The report generator 414 may report that the object data field "D.f" is not consistently protected by an appropriate lock.

Detailed Description of the Race Condition Analysis Module Referring to Table 4, there is shown a pseudo-code representation of an exemplary implementation of the Program Race Condition Detection Module 400. The pseudo-code used in Table 4 is, essentially, a computer language using universal computer language conventions. While the pseudo-code employed here has been invented solely for the purposes of this description, it is designed to be easily understandable by any computer programmer skilled in the art.

TABLE 4

Example of a Program Race Condition Detection Module

```
// Node Generation Procedure. See also FIG. 4, block 406
for each method declaration M {
    create a new node M
    if (M includes locking information)
    then
        let M.synchronization_information = class type
        enclosing the method
    else
        let M.synchronization_information = empty set
}
for each field declaration F {            // alt. embodiment does not
    create a new node F                    // create nodes for local
    let F.synchronization_information =
    empty                                  // (unshared) data fields
}
for each synchronization statement S{
    create a new node S
    let S.synchronization_information = class
    type of the entity being locked
}
// Edge Generation Procedure. See also FIG. 4, block 408
for each access to an object data field FA{  // read or write
    create a new directed edge FA
        start the new edge at the node representing the closest method
        declaration or synchronization statement enclosing the field
        access, and point to the node representing the object data
        field declaration
}
for each method call MC {                 // control transfers
    create a new directed edge MC
```

TABLE 4-continued

Example of a Program Race Condition Detection Module

```
        start the new edge at the node representing the closest method
        declaration or synchronization statement enclosing the method
        call, and point to the node(s) representing the method
        declaration(s) for every method that can be called by the method
        call instruction being processed
}
for each synchronization statement SS {
    create a new directed edge SS
        start the new edge at the node representing the closest method
        declaration or other synchronization statement enclosing the
        synchronization statement, and point to the node representing the
        synchronization statement
}
// Synchronization Value Generation Procedure.
See also FIG. 4, block 410
for each node N {
    let N.synchronization_value = set of all class reference types
}
for each root node N {        // root nodes are main() and run() in the
    call intersect(N, empty set)   // example shown in FIG. 2 and Table 2
}
// Intersect Procedure
intersect(node N, synchronization value SV)
{
    let T = (N.synchronization_value intersect SV) union
        (N.synchronization_information)
    if (N.synchronization_value does not equal T
    then {
        N.synchronization_value = T
        for each successor node M of N{
            call intersect(M, T)
        }
    }
}
// Report Procedure
    Report potential race conditions corresponding to all data field nodes
    N for which N.synchronization_value is null.
```

The operation of the exemplary implementation of the Program Race Condition Detection Module shown in Table 4 is explained next. In particular, operation of the module will be explained by showing how it would analyze the program shown in Table 2.

First, a Node Generation Procedure creates a set of nodes representing a specified computer program's method declarations, field declarations, and synchronization statements. This node creation step is the first step of creating a synchronization graph for the specified program. FIG. 2 represents the nodes 202–212 generated by the Node Generation Procedure when the specified program is the one shown in Table 2.

When a node represents a method declaration that includes a lock designation, the Node Generation Procedure sets the node's synchronization information to equal the lock designation. Otherwise, the node's synchronization information is set to "empty," or "0." For example, nodes 202, 204 and 208 in FIG. 2 represent respective method declarations for the "main," "start" and "run" methods. None of the method declarations for these methods includes a lock designation. Therefore, the synchronization information for each of the nodes representing these method declarations is set to "0."

When a node represents a field declaration, the Node Generation Procedure sets the node's associated synchronization information to empty. For example, node 212 in FIG. 2 represents the object data field declaration for "D.f." Node 212's synchronization information is appropriately set to "0."

When a node represents a synchronization statement, the Node Generation Procedure sets the node's synchronization information equal the class-type of the object being synchronized on. For example, nodes 206 and 210 in FIG. 2 represent synchronization statements. Both synchronization statements synchronize on object data field "d," which has a class-type of "D." Therefore, nodes 206 and 210 have their synchronization information set to "D."

Next, an Edge Generation Procedure creates a set of directed edges (e.g., edges 214–222 in FIG. 2) representing execution paths of a computer program, and in particular control transfers to object methods, synchronization statements, and program accesses to object data fields. A directed edge is created for each method call in the specified program (i.e., control transfer to an object method). A directed edge for a method call (control transfer) starts at a node that represents a closest method declaration or synchronization statement in the computer program enclosing the method call. The directed edge points to the node that represents the method declaration statement for the called method. For example, a control transfer occurs when a program expression in main( ), represented by node 202 in FIG. 2, calls start( ), represented by node 204. A directed edge 214 representing this control transfer starts at node 202 and points to node 204.

A directed edge 214–222 is created for each access by the specified program to an object data field. A directed edge for an object data field access starts at the node in the synchronization graph 200 that represents the closest method declaration or synchronization statement enclosing the object data field access in the specified program. The directed edge points to the node in the synchronization graph 200 that represents the declaration of the object data field being accessed. For example, directed edges 218 and 222 represent program accesses to object data field "D.f." Directed edges 218 and 222 start at a closest node, nodes 206 and 210, respectively, representing a closest synchronization statement enclosing the object data field access. The directed edges 218 and 222 point to the node 212 that represents the declaration of the object data field, "D.f," being accessed.

As explained below, in another preferred embodiment, nodes are not created and thus edges are not created for declarations of "local" data fields that are not shared between threads.

A directed edge 214–222 is created for each synchronization statement in the specified program. Each synchronization statement protects a set of program expressions with a designated lock. A directed edge for a synchronization statement starts at a node that represents the closest method declaration or other synchronization statement enclosing the synchronization statement in the specified program. The directed edge points to the node in the synchronization graph 200 that represents the synchronization statement. For example, directed edge 220 in FIG. 2 represents a synchronization statement that is declared in the run( ) method. Directed edge 220 starts at the node 208 representing the closest method declaration (i.e., the declaration for the run( ) method) that encloses the synchronization statement. The directed edge 220 points to the node 210 that represents the synchronization statement in the specified program.

After the directed edges have been generated, the resulting set of nodes and edges represent a synchronization graph, one example of which is shown in FIG. 2.

Next, a Synchronization Value Generation Procedure generates a synchronization value specifying a set of lock designations for each node in a synchronization graph. A node's synchronization value indicates all locks that are consistently held along all execution paths in the specified computer program to the particular method call, object data field access, or synchronization statement represented by that node.

First, the Synchronization Value Generation Procedure initializes a synchronization value for each node in the synchronization graph to equal a set of all object class reference types. Next, a synchronization value is determined for each node in the synchronization graph. The synchronization value equals a union of first and second values. (See the Intersect Procedure portion of Table 4.) The first value corresponds to a node's synchronization information, and the second value corresponds to an intersection of all lock designations applicable to each other node in the synchronization graph for which there is a directed edge pointing to the node from the other node. The Intersect Procedure can also be called more than once for a node with only one incoming edge. For example, if node N1 has an edge point to node N2, every time node N1's synchronization value changes value (i.e., is reduced in size), the Intersect Procedure is called for node N2.

If the new synchronization value generated (by the Intersect Procedure) for a node of the synchronization graph is not equal to its former value, the node's synchronization is updated, and then the Intersect Procedure is called for all successor nodes of the node whose synchronization value was updated. By calling the Intersect Procedure for each root node of the synchronization graph, the Intersect Procedure will automatically generate synchronization values for all nodes of the graph. The Intersect Procedure will be called for each node at least once, and more than once in the case of each node to which more than one edge points.

For example, node 212, representing object data field declaration "D.f," has a synchronization value of "D." Node 212's synchronization value indicates that a lock on an object with a class type "D" is consistently held along all execution paths (represented by directed edges 218 and 222) in the computer program that access object data field "D.f." More particularly, node 212's synchronization value is a union of node 212's synchronization information ("0") with an intersection of the synchronization values applicable to nodes 206 and 210. Both node 206 and node 210 have an associated synchronization value of "D."

The exemplary implementation of the Program Race Condition Detection Module shown in Table 4 is not meant to be limiting in any way. This implementation is shown solely for purposes of explanation. Using teachings provided in this disclosure, person skilled in the art of computer programming could implement the present invention to generate and analyze a synchronization graph in a variety of ways.

Alternative Embodiments for Reducing the Occurrence of False Reports of Potential Race Conditions The implementation of the Program Race Condition Module disclosed above may produce false reports of potential race conditions. For instance, an object data field that is only accessed by a single thread (without lock protection) will be flagged as a potential race condition. This indication is erroneous. Actual race conditions only occur on shared data fields, and a data field that is accessed by a single thread is not shared.

The present invention can be implemented to reduce false reports of potential race conditions by: (a) associating a lock with methods in a computer program that are single threaded; (b) inferring which object data fields are not shared among parallel executing threads; and (c) utilizing a more accurate approximation to build a synchronization graph.

Reducing False Reports

The present invention can be implemented to reduce false alarms of potential race conditions on object data fields by associating a lock with methods in a computer program that are single threaded, using a special "lock" that it is not associated with any other method declaration, field declaration, or synchronization statement in the computer program. To illustrate this idea, consider the pseudo-code shown in Table 5, where an alternative to the Synchronization Value Generation Procedure of Table 4 is shown. The alternative procedure in Table 5 associates a lock with method main( ).

TABLE 5

Alternative Embodiment of the Synchronization Value Generation Procedure

```
for each node N{
    let N.synchronization_value = set of all class reference types
}
let N = the node representing the main() method declaration
let "Mainlock" be distinct from the set of all class reference types
call intersect(N, Mainlock)
for each node N corresponding to a run() method declaration {
    call intersect(N, empty set)
}
```

This example associates a lock with method main( )—"Mainlock." Of course, Mainlock is not an actual lock, but rather is a "pseudo lock" or pretend lock that is assigned to the main( ) method declaration solely for the purpose of avoiding false race condition reports. Object data fields declared in method main( ) are associated with this lock. The present invention will correctly determine that there are no potential race conditions associated with method main's object data fields because it appears that the "Mainlock" lock is consistently held during all accesses to object data fields declared in method main( ).

Alternatively, since class structures typically exist in class hierarchies, a lock can be explicitly associated with a single threaded method in a computer program by appropriately coding the computer program. The lock associated with the method will typically not be associated with any other method declaration, field declaration, or synchronization statement in the computer program.

To illustrate this idea, consider the program illustrated in Table 6, where a program's main thread is associated with a lock programmatically within the program's source code.

TABLE 6

Example of Main Thread Association With a Special Lock

```
class Mainlock {}
class C {
    public static void main (String[] args) {
        synchronized(new Mainlock()) {    // synchronize on the lock
                                          // associated with
                                          // class "Mainlock"
            // ... add body of main() here ...
        }
    }
}
```

The main( ) method, a single threaded main thread in this example, synchronizes on a lock having a class-type of "class Mainlock." This synchronization will not change the behavior of a computer program designed according to this example. The benefit of the synchronization is that false alarms relating to the object data fields in the main thread are eliminated. The present invention, upon analyzing the computer program, will consider object data fields local to the main thread to be consistently protected by the "Mainlock" lock.

Data Sharing Analysis

The present invention can be implemented to infer information concerning which object data fields are not shared between parallel executing threads. As noted above, actual race conditions only occur on data fields that are shared. The present invention can use this information to build a synchronization graph that represents a program's object data field declarations in such a way that false alarms are reduced. To illustrate this idea, consider the program shown in Table 7.

TABLE 7

Example of Shared and Unshared Data Fields

```
class C{
        static D d;         // shared data field
        int i;              // local data field
}
class D{
        int f;              // shared data field
}
```

An object data field is considered shared by all instances of a class when the object data field is declared with a "static" modifier, or when the data field is an instance variable (associated with and accessed through a particular object). Object data field "d" of class C is shared, since it is declared with a "static" modifier. Object data field "f" of class D is also shared since it is reachable from shared data field "d." Object data field "i" of class C is not shared since it is a local data field.

Using this inferred sharing information, a synchronization graph may represent only those object data field declarations corresponding to shared data fields. In other words, the Node Generation Procedure in this embodiment does not generate nodes for object data field declarations that are not shared data fields. Alternately stated, it does not generate nodes for data field declarations for local data fields.

In yet another embodiment, each node in a synchronization graph representing an unshared data field could be marked. This mark may be used by the Report Procedure to determine that "marked" nodes do not represent data fields with potential race conditions.

Data Flow Analysis

Up to this point, a node in a synchronization graph is created based on a "standard approximation" that creates only one node for each specific object data field declared in a class structure. However, this standard approximation may create false alarms since, multiple instances of a particular object (defined by a class structure declaring data fields) can be dynamically allocated. The Node Generation Procedure shown in Table 4 merges object data field declarations of different run-time objects (i.e., objects that are dynamically created at run time) of the same class into one node. This "merging" can result in false alarms. To illustrate this problem, consider the program shown in Table 8, which uses multiple objects of the same type. The program illustrated in Table 8 is written in the Java programming language, but the problem illustrated is applicable to all multithreaded programming environments.

TABLE 8

Example of Program using Object Data Field of Different Objects of the Same Type

```
public class T extends Thread {
    static D d1 = new D();        // accessed by the main thread
    static D d2 = new D();        // accessed by the new thread
    public static void main (string[ ]args) {   // main thread starts here
        (new T()).start();         // start a new thread
        d1.f++;                    // access an object data field
    }
    public void run() {            // the new thread starts here
        synchronized(d2) {         // acquire a lock on the class D object
            d2.f--;                // access an object data field
        }
    }
}
class D{
    int f = 0;
}
```

This program does not actually contain a potential race condition because object data field "f" is accessed through two different object instances of class D (objects "d1" and "d2," respectively). As long as an object data field is not shared by multiple instances of a class (i.e., an object data field declared with a "static" modifier) access to an object data field is only through the specific run-time object that implemented the object data field's class structure. However, since both instance objects implement class structure D, the standard approximation merges "d1.f" and "d2.f," and represents object data field "D.f" with only one node in the synchronization graph for this program. Thus, accesses to "D.f" by instance objects "d1" and "d2" are erroneously represented in the synchronization graph as referring to the same "D.f."

The present invention can be implemented to solve this "merging" problem by utilizing a more accurate approximation than the standard approximation to build a synchronization graph. A more accurate approximation insures that data fields belonging to unique object instances of the same class-type are not merged into one node in the synchronization graph. This idea can be illustrated by referring to Table 9, wherein there is shown a pseudo-code representation of a more accurate approximation that does not merge an object data field of different run-time objects of the same class type.

TABLE 9

Example of Not Merging an Object Data Field of Different Run-Time Objects of the Same Class

```
for each declaration of a field "f" in a class "C" in the program {
    for each tag T that can be used to denote objects of class "C"{
        create a new node, named "T.f," in the synchronization graph;
        let the synchronization information associated with this node be
            empty;
    }
}
for each access (i.e., read or write operation) to a data field{
    let "e.f." denote the data field access, where "e" is an expression, and
    "f" is a data field name;
    for each tag T in the set of tags denoting objects that "e"
    can point to{
        add an edge to the graph, starting at the node for the closest
        method declaration or synchronization statement enclosing the
        field access, and ending at the node for "T.f";
    }
}
```

The pseudo-code in Table 9 represents each object instance of class-type D with a respective node in a synchronization graph. Using this representation, no false alarm is reported for the program shown in Table 8. This implementation generates a set of nodes for at least a subset of all of a computer program's object data field declarations. Each node in the set of nodes corresponds to a distinct allocation statement in the computer program that declares a run-time object implementing a respective object data field declaration's class structure.

For example, the program in Table 8 has two dynamic (run-time) object allocation statements (the "new" instructions). Both of these statements allocate an object instance of class type "D" and thus both indirectly allocate an object data field f for a corresponding instance of a class D object. Using this information to build a synchronization graph, the synchronization graph would correctly represent an access to data field "d1.f" as being distinct from an access to data field "d2.f." Subsequent analysis of this synchronization graph would indicate that no potential race conditions exist for either instance of object data field "D.f."

A Computer Program Product

The present invention can be implemented as a computer program product that includes a computer program mechanism embedded in a computer readable storage medium. For instance, the computer program product could contain the program modules shown in FIG. 4. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method for statically detecting potential race conditions in a multi-threaded computer program, the computer program being written in an object oriented programming language and having at least one class, each class having a structure including at least one method or at least one data field defined therein, each class being a template for a run-time object that implements the class structure, the method comprising:

generating a synchronization graph representing method declarations, object data field declarations and synchronization statements in the computer program; each method declaration, object data field declaration and synchronization statement in the computer program that is represented by the synchronization graph being represented by a respective node in the synchronization graph; wherein each respective node and its associated method declaration, object data field declaration or synchronization statement is associated with a single respective class of the at least one class;

the synchronization graph generating step including:
storing for each node in the synchronization graph synchronization information indicating any locks declared in the method declaration, object data field declaration or synchronization statement associated with the node; and
generating edges between the nodes of the graph representing execution paths of the program; each edge originating at a respective first node and pointing to a respective second node;

traversing the synchronization graph, and generating for each node a synchronization value representing a union of first and second values, the first value corresponding to the synchronization information stored for the node, and the second value corresponding to an intersection of all locks applicable to each other node in the graph for which there is an edge pointing to the node from the other node; and reporting at least a subset of the nodes representing object data field declarations whose synchronization value is a predefined null value.

2. The method of claim 1, wherein the computer program, when executing, has a main thread associated with a main method that is not called recursively, and wherein the step of generating a synchronization graph associates the main method with a special lock that is not associated with any other method declaration, object data field declaration, or synchronization statement in the computer program.

3. The method of claim 1, further comprising:
identifying which, if any, object data fields in the computer program are shared data fields; and
wherein the generating step, when representing object data field declarations, only represents object data field declarations corresponding to shared data fields.

4. The method of claim 1, where the generating step, when representing object data field declarations, generates a set of nodes for an object data field declaration, each node in the set of nodes corresponds to a distinct allocation statement in the computer program declaring a run-time object corresponding to the object field declaration.

5. The method of claim 1, wherein
each edge represents either a control transfer to an object method, a synchronization statement, or a program access to an object data field in the computer program; and
each edge indicates that all locks applicable to the first respective node from which the edge originates are also applicable to the second respective node to which the edge points.

6. The method of claim 1 wherein the object-oriented programming language is Java, each synchronization statement is a Java "synchronize" statement, and the synchronization information stored in each node in the synchronization graph is initialized to a set of all Java class reference types.

7. A computer program product for use in conjunction with a computer system, the computer program product comprising a computer readable storage medium and a computer program mechanism embedded therein, the computer program mechanism comprising:

a program module for statically detecting potential race conditions in a multi-threaded computer program, the computer program being written in an object oriented programming language and having at least one class, each class having at least one method or at least one data field defined therein, the program module including:
instructions for generating a synchronization graph representing method declarations, object data field declarations and synchronization statements in the computer program; each method declaration, object data field declaration and synchronization statement in the computer program that is represented by the synchronization graph being represented by a respective node in the synchronization graph, wherein each respective node and its associated method declaration, object data field declaration or synchronization statement is associated with a single respective class of the at least one class;

the synchronization graph generating instructions including instructions for:

storing for each node in the synchronization graph synchronization information indicating any locks declared in the method declaration, object data field declarations or synchronization statements associated with the node; and generating edges between the nodes of the graph representing execution paths of the program; each edge pointing from a respective first node to a respective second node;

instructions for traversing the synchronization graph, and generating for each node a synchronization value representing a union of first and second values, the first value corresponding to the synchronization information stored for the node, and the second value corresponding to an intersection of all locks applicable to each other node in the graph for which there is an edge pointing to the node from the other node; and instructions for reporting at least a subset of the nodes representing object data field declarations whose synchronization value is a predefined null value.

8. The computer program product of claim 7, wherein the program module, when executing, has a main thread associated with a main method that is not called recursively, and wherein the instructions for generating a synchronization graph associate the main method with a special lock that is not associated with any other method declaration, object data field declaration, or synchronization statement in the computer program.

9. The computer program product of claim 7, further comprising:

instructions for identifying which, if any, object data fields in the computer program are shared data fields; and where the instructions for generating a synchronization graph, when representing object data field declarations, only represents object data field declarations corresponding to shared data fields.

10. The computer program product of claim 7, where the instructions for generating a synchronization graph, when representing object data field declarations, generates a set of nodes for an object data field declaration, each node in the set of nodes corresponding to a distinct allocation statement in the computer program declaring a run-time object corresponding to the object field declaration.

11. The computer program product of claim 7, wherein each edge represents either a control transfer to an object method, a synchronization statement, or a program access to an object data field in the computer program; and each edge indicates that all locks applicable to the first respective node from which the edge originates are also applicable to the second respective node to which the edge points.

12. The computer program product of claim 7 wherein the object-oriented programming language is Java, each synchronization statement is a Java "synchronize" statement, and the synchronization information stored in each node in the synchronization graph is initialized to a set of all Java class reference types.

13. An apparatus for statically detecting potential race conditions in a multi-threaded computer program, the computer program being written in an object oriented programming language and having at least one class, each class having at least one method or at least one data field defined therein, the apparatus comprising:

means for generating a synchronization graph representing method declarations, object data field declarations and synchronization statements in the computer program; each method declaration, object data field declaration and synchronization statement in the computer program that is represented by the synchronization graph being represented by a respective node in the synchronization graph, wherein each respective node and its associated method declaration, object data field declaration or synchronization statement is associated with a single respective class of the at least one class;

the synchronization graph generating means including means for storing for each node in the synchronization graph synchronization information indicating any locks declared in the method declaration, object data field declarations or synchronization statements associated with the node;

means for generating edges between the nodes of the graph representing execution paths of the program; and means for traversing the synchronization graph, and generating for each node a synchronization value representing a union of first and second values, the first value corresponding to the synchronization information stored for the node, and the second value corresponding to an intersection of all locks applicable to each other node in the graph for which there is an edge pointing to the node from the other node; and means, coupled to the synchronization graph, for generating a report indicating at least a subset of the nodes representing object data field declarations whose synchronization value is a predefined null value.

14. The apparatus of claim 13, wherein the computer program, when executing, has a main thread associated with a main method that is not called recursively, and the synchronization graph generating means associates the main method with a special lock that is not associated with any other method declaration, object data field declaration, or synchronization statement in the computer program.

15. The apparatus of claim 13, further comprising:

means for identifying which, if any, object data fields in a computer program are shared data fields; and wherein the synchronization graph generating means, when generating nodes representing object data field declarations, only generates nodes representing those object data field declarations corresponding to shared data fields.

16. The apparatus of claim 13, wherein the synchronization graph generating means, when generating nodes representing object data field declarations, generates a set of nodes for an object data field declaration, each node in the set of nodes corresponding to a distinct allocation statement in the computer program declaring a run-time object corresponding to the object field declaration.

17. The apparatus of claim 13, wherein each edge represents either a control transfer to an object method, a synchronization statement, or a program access to an object data field in the computer program; and each edge indicates that all locks applicable to the first respective node from which the edge originates are also applicable to the second respective node to which the edge points.

18. The apparatus of claim 13 wherein the object-oriented programming language is Java, each synchronization statement is a Java "synchronize" statement, and the synchronization information stored in each node in the synchronization graph is initialized to a set of all Java class reference types.

* * * * *